United States Patent [19]

Murakami et al.

[11] 4,118,151

[45] Oct. 3, 1978

[54] PUMP DEVICE

[75] Inventors: Takao Murakami, Chigasaki; Yasuo Ishikawa, Yokohama; Masahiro Ito, Tokyo, all of Japan

[73] Assignee: Tokico Ltd., Kawasaki, Japan

[21] Appl. No.: 735,210

[22] Filed: Oct. 22, 1976

Related U.S. Application Data

[63] Continuation-in-part of Ser. No. 562,334, Mar. 26, 1975, abandoned.

[30] Foreign Application Priority Data

Apr. 3, 1974 [JP] Japan ................................ 49-36919

[51] Int. Cl.[2] ...................... F16D 25/11; F16D 25/00; F04B 49/00

[52] U.S. Cl. .................................. 417/223; 192/91 A

[58] Field of Search .............. 417/213, 223; 192/91 A

[56] References Cited

U.S. PATENT DOCUMENTS

| | | | |
|---|---|---|---|
| 1,270,794 | 7/1918 | Dawson et al. | 192/91 A |
| 2,296,385 | 9/1942 | Haynes | 417/223 |
| 2,650,677 | 1/1953 | Klein | 417/223 |
| 2,684,742 | 7/1954 | Eason | 192/91 A |
| 3,502,029 | 3/1970 | Halloday | 417/223 |
| 4,009,971 | 3/1977 | Krohn | 417/223 |

FOREIGN PATENT DOCUMENTS

| | | | |
|---|---|---|---|
| 341,303 | 12/1934 | Italy | 192/91 A |

*Primary Examiner*—William L. Freeh

*Attorney, Agent, or Firm*—Haseltine, Lake, & Waters

[57] ABSTRACT

A pump device comprises a pump for pumping a liquid from a liquid source, a rotational driving power source operable continuously, transmission means for transmitting rotational driving power from the power source to the pump, detecting means for detecting the pressure of the liquid pumped and delivered by the pump, and clutch means provided in the power transmission path of the transmission means. The liquid pressure detecting means is adapted to operate accordingly when said liquid pressure fluctuates from a predetermined set pressure to controllably vary the rate of power transmission of said clutch means, while causing the operation of said rotational driving power source to continue uninterruptedly, thereby to control the pump delivery pressure at a constant value.

1 Claim, 13 Drawing Figures

FIG. 2
FIG. 4
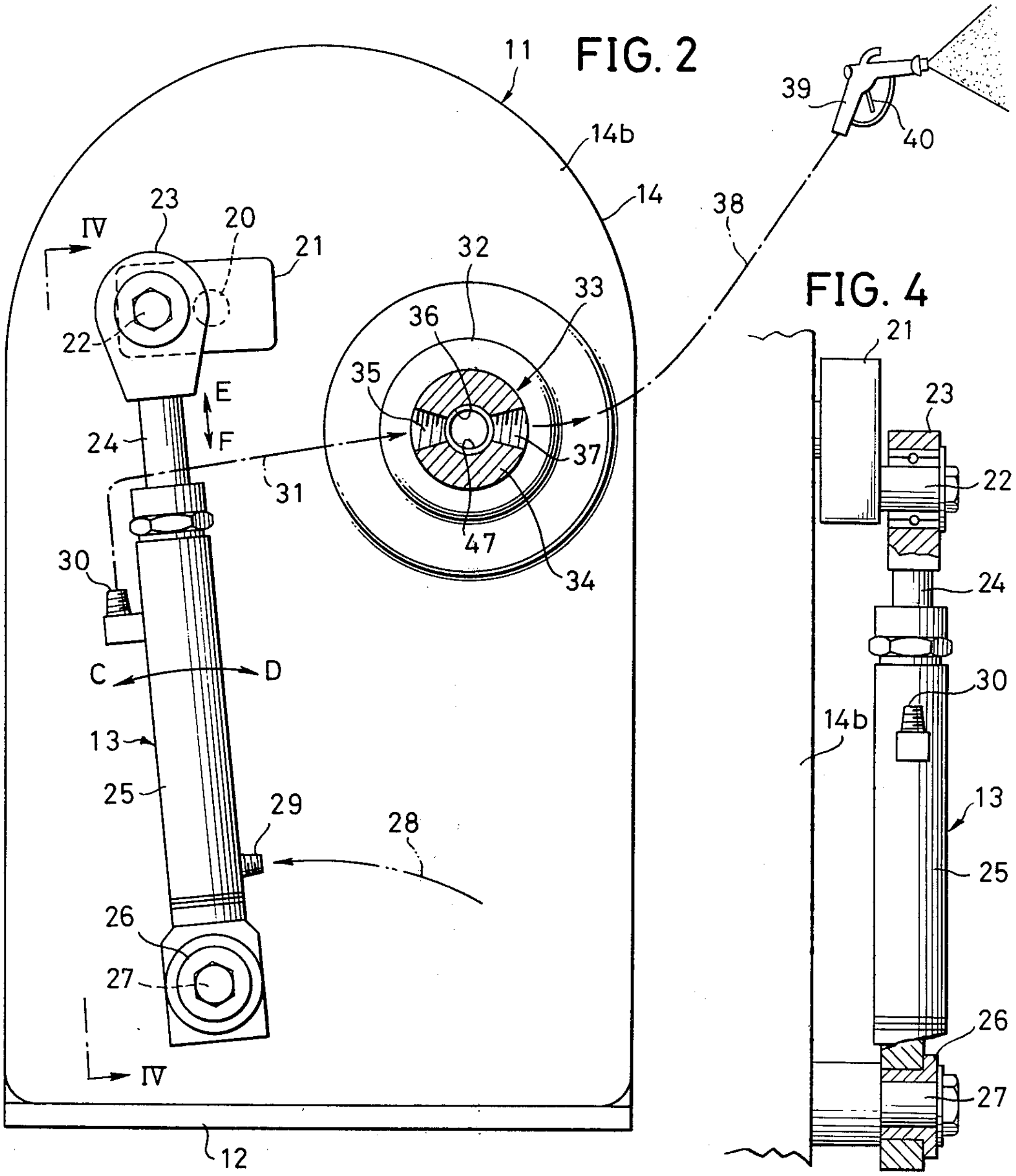
FIG. 5
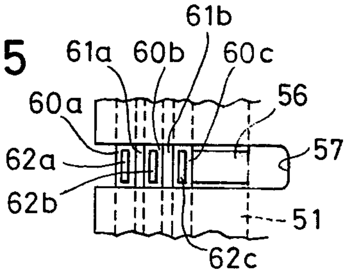
FIG. 6
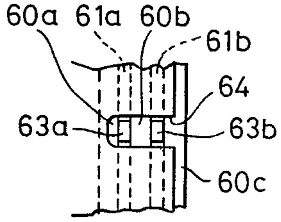

PUMP DEVICE

BACKGROUND OF THE INVENTION

This application is a continuation-in-part application of U.S. patent application Ser. No. 562,334 filed Mar. 26, 1975, now abandoned.

The invention relates generally to pump devices, and more particularly to a liquid pump device used in apparatuses such as spray-coating apparatus and so adapted that its delivery pressure can be automatically maintained to be constant, with the driving power source maintained in operating state, in accordance with an increase in the liquid pressure due, for example, to small rate of ejection of the spray nozzle of the spray-coating apparatus whereby this ejection rate is less than the pump delivery rate.

In general, a pump device used in a spraying apparatus for operations such as a spray-painting apparatus is of constant delivery type. For this reason, in the case where the pump device is used in a spraying apparatus having a spray nozzle of small-diameter opening and an ejection rate less than the delivery rate of the pump device, the quantity of liquid supply per unit time from the pump device becomes greater than the quantity of liquid ejection per unit time of the nozzle. Consequently, the pressure of the liquid leaving the delivery outlet of the pump device rises abnormally. If, in this case, the operation of the pump device is continued, an abnormally high back pressure will act on the pump device.

Accordingly, it is necessary to cause the pump to operate intermittently for the purpose of protecting the pump.

The conventional method of achieving this intermittent operation of the pump has been to operate intermittently an electric motor used for driving the pump. Consequently, since the motor is run intermittently, for example, every 3 to 4 seconds, there arises several problems such as a tendency of the motor to overheat, rapid fatigue of the motor, the necessity of stopping the motor and permitting it to rest for cooling thereof when it becomes overheated, the impossibility of continuously operating the apparatus over a long period, and a lowering of the productivity or work efficiency of the apparatus.

There has also been a pump device which is not of the constant delivery type but has a delivery rate which can be varied to equal the liquid ejection rate of the spraying apparatus. This pump device, however, is expensive and is accompanied by other problems such as troublesome handling and poor work efficiency.

In another pump device known heretofore, a special electric motor for exclusive use in driving the pump is necessary. A special motor of this nature is expensive, and, moreover, the productivity of the device is low.

In still another pump device known heretofore, the rotating output shaft of an electric motor is coupled directly to the shaft of the pump. However, since the rotation of the motor is transmitted directly to the pump, there arise difficulties such as rapid wear of parts and troublesome maintenance.

SUMMARY OF THE INVENTION

Accordingly, it is general object of the present invention to provide a novel and useful pump device wherein the above described difficulties accompanying known pump devices have been overcome.

Another and specific object of the invention is to provide a pump device so adapted that, when there is a fluctuation of the pressure of the fluid at the delivery outlet of the pump from a predetermined pressure, this delivery pressure of the pump is controlled at a constant value while the operation of the driving power source is continued without interruption.

Still another object of the invention is to provide a pump device which is used in a liquid spraying device, and in which the liquid pressure in the spray liquid transfer path, varying with the operational state of the spraying device, is detected to control a clutch mechanism and thereby to control the operation of the pump, whereby the liquid pressure in the liquid transfer path is controlled and thus prevented from exceeding a predetermined pressure.

A further object of the invention is to provide a pump device having a clutch mechanism operating when the pressure of the fluid at the pump delivery exceeds a specific preset value to assume a "half-clutch" state (partial power transmission state) and thereby to reduce the driving power transmission rate from the power source continuously operating to the pump.

Other objects and further features of the invention will be apparent from the following detailed description with respect to the preferred embodiment of the invention when read in conjunction with the accompanying drawings.

BRIEF DESCRIPTION OF THE DRAWINGS

In the drawings:

FIG. 2 is a diagrammatic elevation, with parts cut away, of the pump device shown in FIG. 1 as viewed orthogonally from the right;

FIG. 4 is a side elevation taken along the line IV — IV in FIG. 2 as viewed in the arrow direction;

FIG. 5 is a fragmentary top plan view taken along the line V — V in FIG. 3 as viewed in the arrow direction;

FIG. 6 is a fragmentary bottom plan view taken along the line VI — VI in FIG. 3 as viewed in the arrow direction;

DETAILED DESCRIPTION

Figure 1:
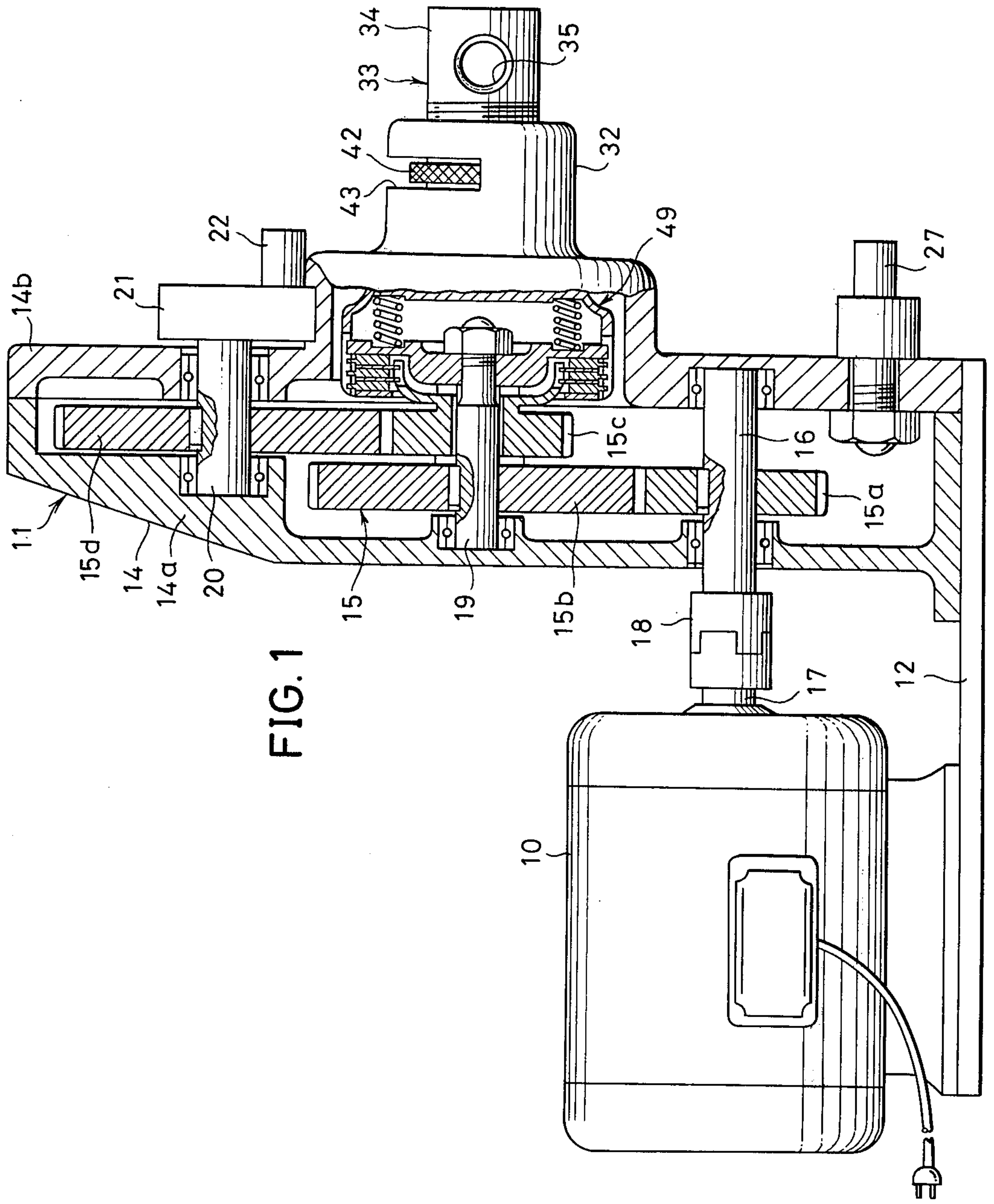
FIG. 1 is a side elevation, with a part in vertical section, showing one embodiment of the pump device according to the invention.

Referring first to FIG. 1, an electric motor 10 for driving a pump and a rotational power transmitting mechanism 11 are fixedly mounted on a base structure 12. The pump 13 is mounted on the power transmitting mechanism 11 as described hereinafter with reference to FIG. 2.

The moving parts of the power transmitting mechanism 11 are enclosed within a housing structure 14 comprising a hollow casing 14*a* and cover 14*b* covering the open front face of the casing 14*a*. This housing structure 14 houses a speed-reducing gear mechanism 15 comprising first-stage through fourth-stage gears 15*a* through 15*d*. The gear 15*a* is fixedly supported on a horizontal rotating shaft 16, which is rotatably supported by the casing 14*a* and cover 14*b* and extends at one end thereof out of the housing 14 through the casing 14*a*, being coupled by a coupling 18 to the rotor shaft 17 of the motor 10. The gear 15*a* is meshed with the gear 15*b*, which is fixedly supported on a horizontal rotating shaft 19 rotatably supported by the casing 14*a*. The gear 15*c* is rotatably fitted on the shaft 19 and is free to rotate as a separate structure relative to the shaft 19. This gear 15*c* is meshed with the gear 15*d*, which is fixedly supported on a horizontal rotating shaft 20 rotatably supported by the casing 14*a* and cover 14*b*.

One end of the shaft 20 extends out of the housing 14 through the cover 14*b* and fixedly supports a crank 21 having a crank pin 22, which is rotatably connected via a bearing 23 to the outer end of a piston rod 24 of the pump 13 as shown in FIGS. 2 and 4. The pump 13 is of constant-delivery plunger type having a cylinder 25, which is pivotally supported at its lower or head end via a bearing 26 on a pivot support pin 27 fixedly supported by the cover 14*b*. The cylinder 25 is provided at its lower or head end with an inlet 29 supplied with coating or painting liquid from, for example, a coating liquid source (not shown) through a pipe line 28. The cylinder 25 is further provided near its upper end with a delivery outlet 30 for liquid discharged by the pumping action of the pump 13.

The liquid delivered through the outlet 30 flows through a pipe line 31, an inlet 35 of a head part 34 of a liquid pressure detecting device 33 provided on an end bracket 32 of the cover 14*b*, a liquid pressure detecting chamber 36 and an outlet 37 of the detecting device 33 and is supplied through a pipe line 38 to a spray nozzle 39.

Figure 3:
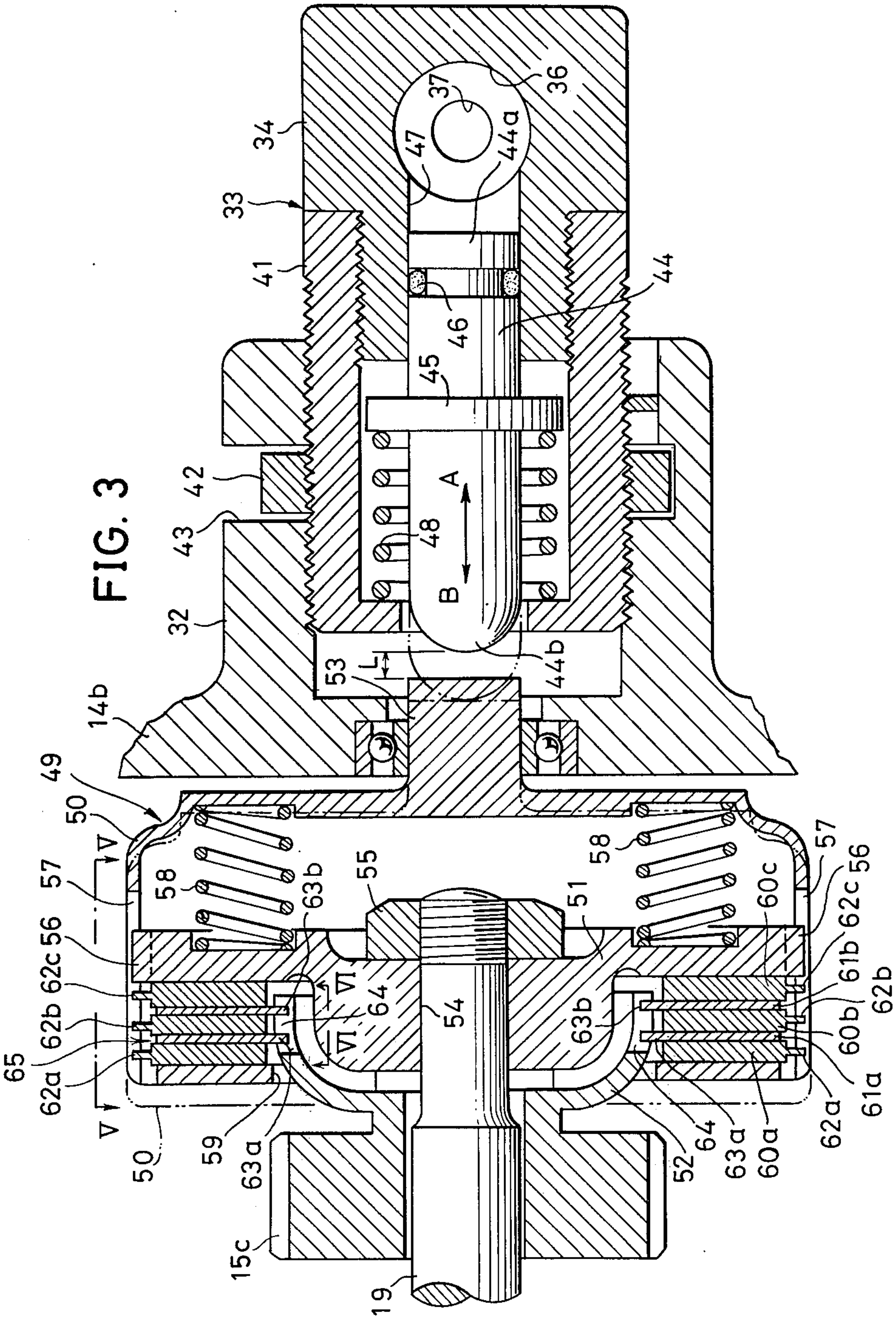
FIG. 3 is an enlarged side elevation in vertical section showing an essential part of the pump device illustrated in FIG. 1.

The liquid pressure detecting device 33 has a construction as shown in FIGS. 1 and 3, in which the above mentioned head part 34 is screwed into a hollow cylindrical member 41 slidably fitted in a hole provided in the end bracket 32. The cylindrical member 41 is provided on its outer cylindrical surface with screw threads, which are meshed with an adjusting nut 42. This adjusting nut 42 is held in a manner permitting its rotation but preventing its translational movement in the axial direction of the cylindrical member 41 within a groove 43 provided in the end bracket.

Within the cylindrical member 41, there is provided a ram 44 having a flange 45 and slidably supported in a manner permitting its translational movement in the axial direction thereof. One end of the ram 44 is slidably fitted in a hole 47 communicating with the aforementioned pressure detecting chamber 36 of the head part 34, an "O" ring 46 being interposed between the ram 44 and the inner wall surface of the head part 34. The extreme end face 44*a* of the ram 44 is subjected to the pressure of the liquid within the chamber 36 and the hole 47. The other end 44*b* of the ram 44 is passed through a hole in an end wall of the cylindrical member 41. Furthermore, a compression coil spring 48 is disposed around the ram 44 and between the end wall of the cylindrical member 41 and the flange 45 of the ram 44.

In the power transmission path from the gear 15*b* to the gear 15*c* within the housing structure 14, there is provided a clutch mechanism 49 having a clutch case 50, a clutch wheel 51, and a clutch drum 52 as principal structural parts.

The clutch case 50 accommodates coaxially therewithin the clutch wheel 51*a* and the clutch drum 52 and has a central shaft part 53 projecting outward from one end face thereof and supported by the cover 14*b* in a manner permitting both its rotation about its axis and its sliding translation in its axial direction (arrow direction A, B).

The clutch wheel 51 has a central hole 54 and is thereby fitted on an end part of the shaft 19 and secured thereto for rotation unitarily therewith by a nut 55 screwed onto the end of the shaft 19. Around the outer peripheral edge of the clutch wheel 51, at specific intervals in the circumferential direction thereof, there are provided outward projections 56, which are respectively engaged in a relatively slidable manner within corresponding grooves 57 formed in the peripheral cylindrical wall of the clutch case 50 in the axial direction thereof as shown in FIG. 5.

The clutch drum 52 is connected integrally and coaxially with one side face of the gear 15*c* and projects into the interior of the clutch case 50 through an opening 59 formed in one end wall thereof. Between the inner surface of the end wall of the clutch case 50 and the clutch wheel 51, there is interposed a clutch plate assembly 65 comprising ring-shaped clutch plates 60*a*, 60*b*, 60*c* and ring-shaped clutch friction plates 61*a* and 61*b* disposed alternately in coaxial arrangement. The clutch plates 60*a*, 60*b*, and 60*c* are provided at specific intervals around their outer peripheral edges with outward projections 62*a*, 62*b*, and 62*c*, which are respectively engaged in a relatively slidable manner within corresponding grooves 57 of the clutch case 50. Since the above mentioned projections 56 of the clutch wheel 51 and the projections 62*a*, 62*b*, and 62*c* of the clutch plates 60*a*, 60*b*, and 60*c* are engaged with their respective grooves 57 in the clutch case 50, the clutch case 50 rotates unitarily with the clutch wheel 51 and the clutch plates 60*a*, 60*b*, and 60*c* and, at the same time, is slidable relative thereto in the axial direction thereof.

At specific intervals around the inner circular edges of the clutch friction plates 61*a* and 61*b*, there are respectively provided inwardly directed projections 63*a* and 63*b*, which are engaged in a relatively slidable manner in corresponding grooves 64 formed with specific spacing in the clutch drum 52. Accordingly, the clutch friction plates 61*a* and 61*b* are slidable in the axial direction relative to the clutch drum 52 and, at the same time, are rotatable unitarily therewith.

A compressed coil spring 58 is interposed between the clutch wheel 51 and the clutch case 50, which is thereby urged by the force of this spring 58 to slide in the arrow direction A (toward the right) as viewed in FIG. 3. Consequently, the clutch plates 60*a*, 60*b*, and 60*c* and the clutch friction plates 61*a* and 61*b* are pressed and clamped between and by the inner surface of the end wall of the clutch case 50 and the clutch wheel 51 and are thereby placed in a state of mutual frictional contact. At the same time, the clutch plate 60*a* is placed in frictional contact with inner surface of the end wall of the clutch case 50, while the clutch plate 60*c* is placed in frictional contact with the clutch wheel 51, whereby rotation of the clutch wheel 51 can be transmitted through the clutch plate assembly 65 to the clutch drum 52.

The pump device of the above described construction according to the present invention operates as follows. First, at the time of starting of operation, the clutch case 50 of the clutch mechanism 49 is held by the force of the spring 58 at the limiting sliding position in the arrow direction A, and the clutch drum 52 is in a state wherein rotation of the clutch wheel 51 can be transmitted thereto by way of the clutch plate assembly 65.

Then, when the motor 10 is started, the rotation of its rotor shaft 17 is transmitted by way of the shaft 16, the gears 15*a* and 15*b*, the shaft 19, the clutch wheel 51, the clutch plate assembly 65, the clutch drum 52, the gears 15*c* and 15*d* and the shaft 20 to the crank 21. As a result of the resulting rotation of the crank 21, the piston rod 24 operates slidingly in the arrow directions E, F as the cylinder 25 oscillates in the arrow direction C, D about its pivot support pin 27. Thus, the pump 13 performs pumping action to pump under pressure the liquid arriving through the pipe line 28 from the coating liquid source through the pipe line 31, the liquid pressure detecting device 33, and the pipe line 38 to the nozzle 39. Accordingly, when an operating lever 40 of the nozzle 39 is pulled, the coating liquid is ejected and sprayed onto a surface to be coated (not shown).

During this passage of the liquid delivered under pressure from the pump 13 through the liquid pressure detecting device 33, the end face 44*a* of the ram 44 is subjected to the liquid pressure within the liquid pressure detecting chamber 36 and therefore to a force urging the ram 44 to slide in the arrow direction B. At the time of starting of the operation of the pump 13, the liquid pressure is lower than the normal operating pressure, and, for this reason, the ram 44 is not forced in the arrow direction B, overcoming the force of the spring 48, or even if it is forced to thus slide and abut against the end face of the central shaft 53 of the clutch case 50, it does not have sufficient force to overcome the force of the spring 58 and thereby to cause the shaft 53 and the clutch case 50 to be displaced in the arrow direction B.

Then, in the case where the quantity of liquid ejected per unit time through the nozzle 39 becomes less than the quantity of liquid delivered per unit time by the pump 13, and the pump 13 continues to operate, the pressure of the liquid delivered by the pump 13 increases in accordance with the difference between the quantities of the delivered liquid and the ejected liquid. This increasing liquid pressure acts on the end face 44*a* of the ram 44.

Then, when the delivery liquid pressure exceeds a predetermined pressure, the ram 44 is forced by a force greater than the spring force of the springs 58 and 48 to abut at its extremity end 44*b* against the central shaft 53 and thus slide in the arrow direction B, thereby forcing the clutch case 50 to be displaced in the arrow direction B against the force of the spring 58. The ram 44 and the clutch case 50 thus reach a position, for example, as that indicated by two-dot chain line in FIG. 3.

As a result of the displacement of the clutch case 50, the clutch plate assembly 65 is released from the pressure and clamping action of the clutch case 50 and the clutch wheel 51, whereby the frictional contact mutually between the clutch plates 60*a*, 60*b*, and 60*c* and the clutch friction plates 61*a* and 61*b* and the friction contacts between the clutch plate 60*a* and the clutch case 50 and between the clutch plate 60*c* and the clutch wheel 51 are released. Consequently, the rotation of the clutch wheel 51 is no longer transmitted to the clutch drum 52.

Thus, when the delivery pressure of the pump 13 becomes greater than the aforementioned predetermined value, the clutch mechanism 49 operates automatically to interrupt the transmission of rotational power from the motor 10, and although the motor 10 continues to rotate, the operation of the pump 13 is stopped.

Then, as the ejection of liquid is continued through the nozzle 39 after the operation of the pump 13 is thus stopped, the liquid pressure within the pipe lines 31 and 38 and the liquid pressure detecting device 33 drops. When this pressure becomes less than the above mentioned predetermined value, the spring force of the springs 58 and 48 becomes greater than the force due to the liquid pressure acting on the ram 44, whereby the clutch case 50 and the ram 44 are displaced in the arrow direction A. As a consequence, the clutch plate assembly 65 is again pressed by and between the clutch case 50 and the clutch wheel 51, and the clutch mechanism 49 again assumes its state of transmitting the rotation of the shaft 19 to the gear 15*c*. Thus, the pump 13 is automatically caused to operate again.

In this manner, the clutch mechanism 49 operates automatically in response to the detection of liquid pressure by the liquid pressure detecting device 33 to interrupt and restore the transmission of power from the motor 10 to the pump 13, whereby the operation of the pump 13 is automatically stopped and restarted while the motor 10 is kept running continuously.

The aforementioned predetermined value of the detected liquid pressure above which the power transmission of the clutch mechanism 49 is interrupted can be adjustably set by placing a finger tip on the peripheral surface of the adjusting nut 42 exposed in the groove 43 and turning this adjusting nut 42. In order to increase this predetermined value of the detected liquid pressure, the adjusting nut 42 is turned in that direction which causes the entire liquid pressure detecting device 33 to slide and be displaced in the arrow direction A thereby to increase the gap L between the end 44*b* of the ram 44 and the end face of the central shaft 53 of the clutch case 50. The stroke of the ram 44 is thereby increased, and, in order to displace the clutch case 50, the spring 48 must be compressed even more. As a result, the value of the predetermined detected pressure is increased. Conversely, when the adjusting nut 42 is turned in the opposite direction, the entire liquid pressure detecting device 33 is displaced in the arrow direction B, whereupon the gap L between the end 44*b* of the ram 44 and the end face of the central shaft 53 becomes small, and the value of the above mentioned predetermined detected pressure is decreased.

Next, the second embodiment of the pump device according to the present invention will be described in conjunction with drawings of FIGS. 7 through 13.

Figure 7:
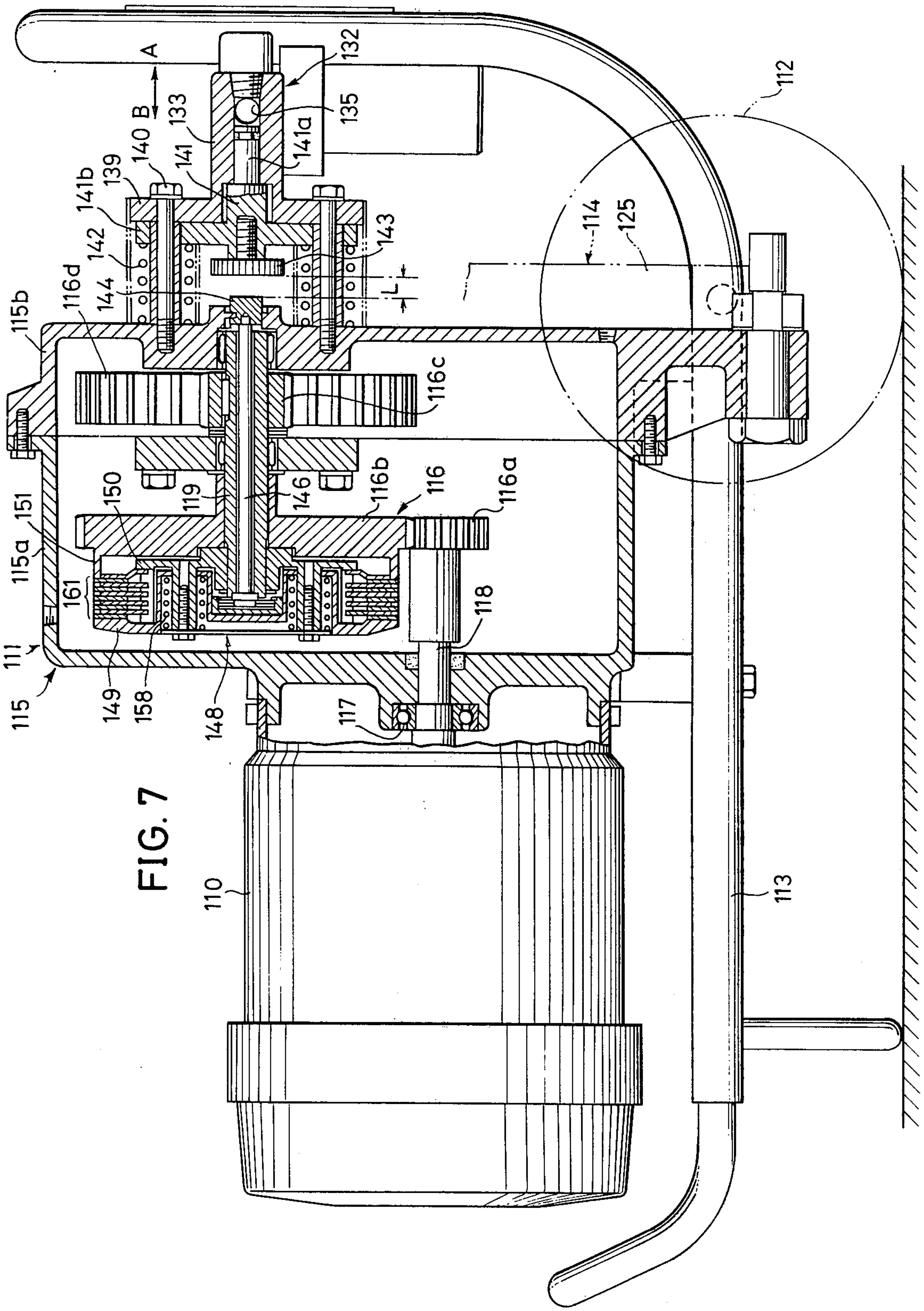
FIG. 7 is a side elevation, with parts cut away and parts in vertical longitudinal section, showing a part of another embodiment of practice of the pump device according to the invention.

Referring to FIG. 7, an electric motor 110 for driving the pump and a rotational power transmission mechanism 110 are fixedly mounted on a movable base chassis 113 having wheels 112. A pump 114 is coupled to the power transmission mechanism 111 as described below with reference to FIG. 8.

The power transmission mechanism 111 is enclosed within a housing structure 115 comprising a hollow casing 115*a* and a cover 115*b* closing the front opening of the hollow casing 115*a*. A speed-reducing gear mechanism 116 comprising first-stage through fourth-stage gears 116*a* through 116*d* is also enclosed within the housing structure 115. The gear 116*a* is fixedly mounted on the outer end of the rotor shaft 118 of the motor 110 extending through a bearing 117 into the interior of the housing structure 115. The gear 116*b*, which is meshed with the gear 116*a*, is loosely fitted on a horizontal rotating shaft 119 and is thereby free to rotate independently thereabout. The gear 116*c* is fixedly mounted on the shaft 119. The gear 116*d*, which is meshed with the gear 116*c* is fixed to a horizontal rotating shaft 120.

Figure 8:
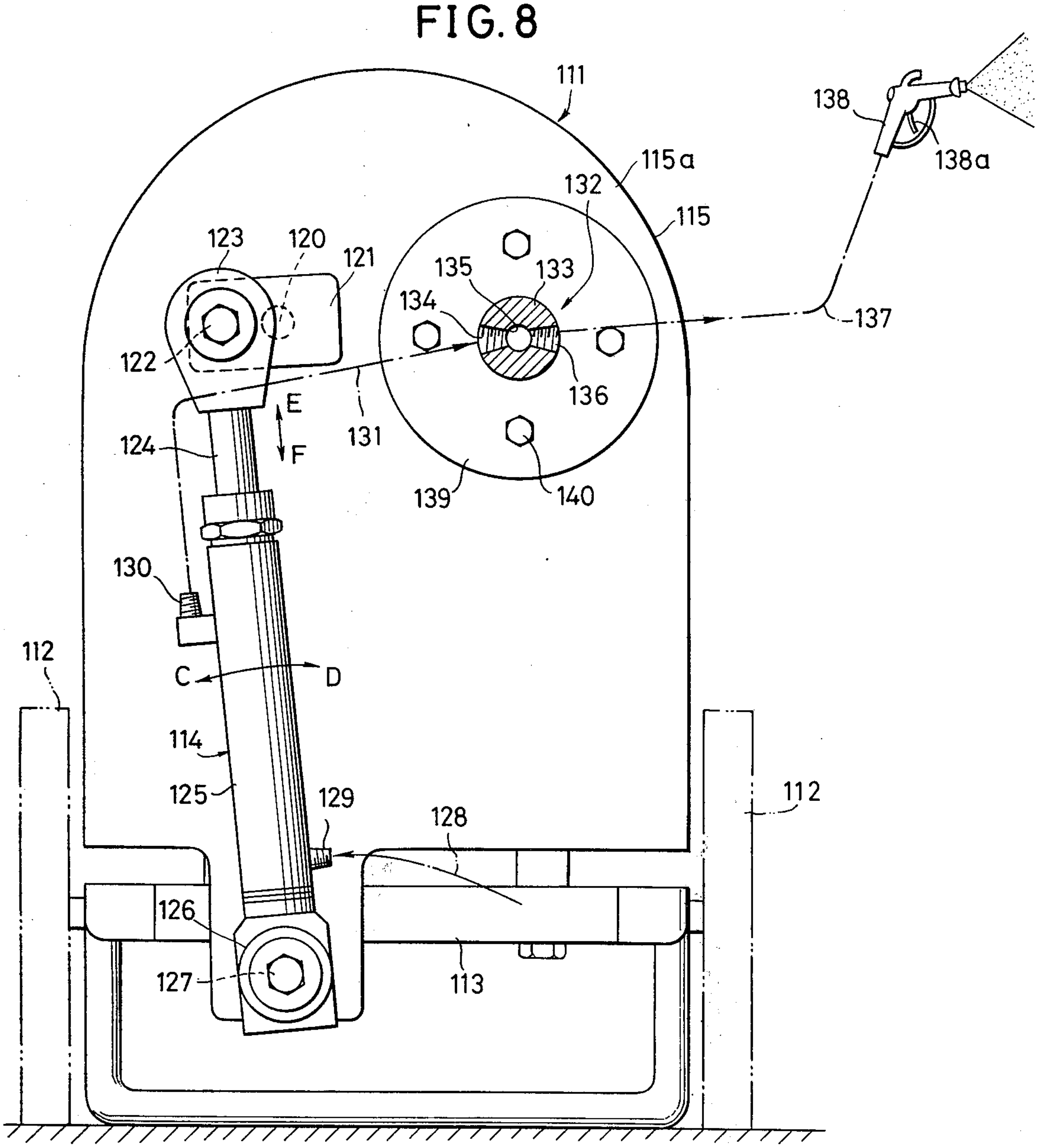
FIG. 8 is a front elevation, with parts cut away and parts shown diagrammatically, showing a part of the pump device shown in FIG. 7.

A crank 121 is fixed to the outer end of the rotating shaft 120 and is provided with a crank pin 122. The outer end of a piston rod 124 of a pump 114 is coupled by way of a bearing 123 to the crank pin 122 as shown in FIG. 8. The pump 114 is of a constant-delivery, plunger type having a cylinder 125 with a lower end pivotally supported through a bearing 126 by a pivot support pin 127. The cylinder 125 is provided at its lower part with an inlet 129 supplied with, for example, a paint liquid from a paint source (not shown) through a pipe line 128. The cylinder 125 is further provided with a delivery outlet 130 through which the liquid is discharged by the pumping action of the pump 114.

The liquid thus discharged through the delivery outlet 130 is sent through a pipe line 131 and, passing through an inlet 134, a liquid pressure detecting chamber 135, and an outlet 136 at the head part 133 of a liquid pressure detecting device 132 provided on the cover 115*b* of the housing structure 115, is supplied through a pipe line 137 to the nozzle of a spraying device 138.

Figure 9:
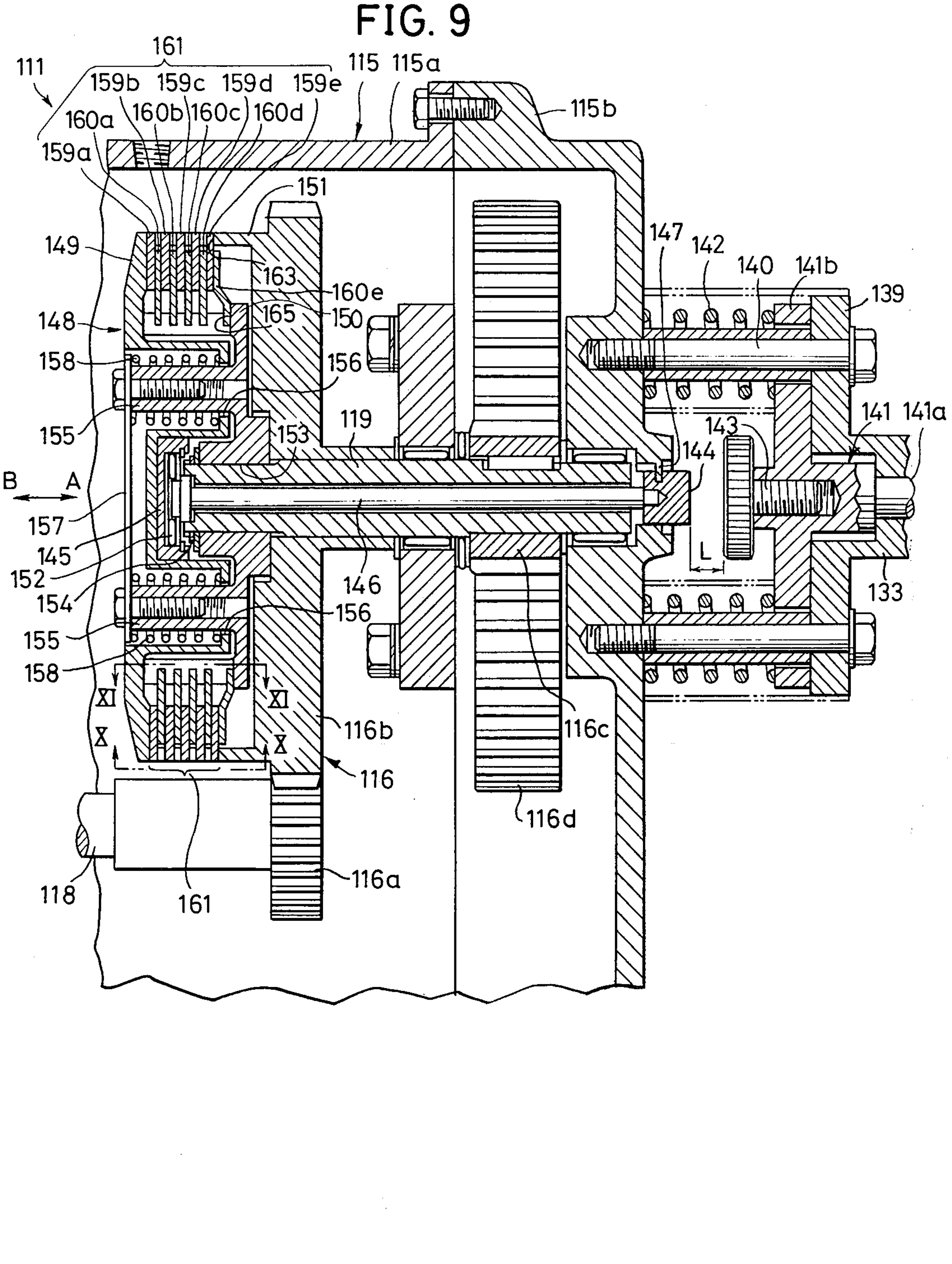
FIG. 9 is a side elevation, in vertical longitudinal section, showing essential parts of the pump device illustrated in FIG. 7.
Figure 10:
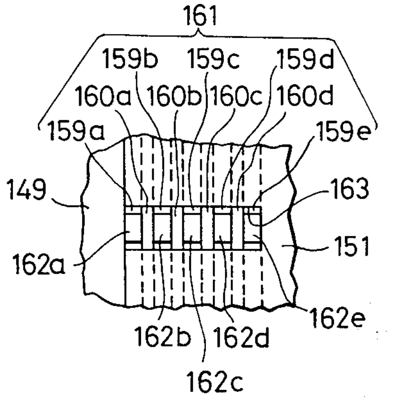
FIG. 10 is a fragmentary bottom view taken along the line X — X in FIG. 9 as viewed in the arrow direction.

The liquid pressure detecting device 132 has a construction as shown in FIGS. 7 and 9 and is held at a certain spacing distance from the cover 115*b* by bolts 140 inserted through a flange part 139, which is an integral part of the head part 133. The interior of the liquid pressure detecting device 132 is formed with three coaxially contiguous cylinders of different diameters in which corresponding parts of a plunger 141 are slidably accommodated, the plunger 141 thereby being free to undergo reciprocating movement through a specific stroke in the arrow directions A, B. One end part 141*a* of the plunger 141, which is of the smallest diameter, confronts the interior of the above mentioned liquid pressure detecting chamber 135 and has an extreme end face functioning as a pressure receiving surface.

At its other end, the plunger 141 has a flange part 141*b*, between which and the cover 115*b*, compression springs 142 are provided to urge the plunger continually in the arrow direction A. An adjusting member 143 is adjustably screwed at its one end into the flange part 141*b* and has at its other end a surface for pressing against a contacted member 144 fixed to one end of a push rod 146. This push rod 146 is coaxially and slidably accommodated within the aforementioned rotating shaft 119, being free to slide axially therewithin through a specific range of movement, and at its other end abuts against a clutch case 149 described hereinafter by way of a disc 145 interposed therebetween. The contacted member 144 is prevented from rotating relative to the cover 115*b* by a rotation preventing device 147.

Within the housing structure 115, a clutch mechanism 148 is provided in the power transmission path from the gear 116*b* to the gear 116*c*. This clutch mechanism 148 comprises, essentially, a clutch case 149, a clutch wheel 150, a clutch drum 151 formed integrally with the aforementioned second-stage gear 116*b*, and a clutch plate mechanism 161 described hereinafter, all coaxially disposed.

The clutch case 149 has the general shape of a dish with a central recessed part, with which is engaged the above mentioned disc 145 rotatably supported by way of a bearing 152 on the end of the above mentioned push rod 146 inserted slidably through the rotating shaft 119.

The clutch wheel 150 is disc shaped and is fitted at its central hole 153 onto the end of the rotating shaft 119 of the third-stage gear 116*c*, being fixed to the shaft 119 by a lock ring 154. The clutch wheel 150 thereby rotates unitarily with the third-stage gear 116*c*. This clutch wheel 150, which is disposed between the above described clutch case 149 and the clutch drum 151, has projecting parts 155 at positions spaced apart around a circle concentric with the clutch wheel 150 and lying between the centerline and outer periphery thereof. These projecting parts 155 are slidably inserted through holes 156 formed at correspondingly alined positions in the wall of the clutch case 149 as shown in FIG. 9.

By this construction, the clutch case 149 is caused to rotate unitarily with the clutch wheel 150 and, at the same time, can undergo transitional sliding in the arrow directions A, B relative to the clutch wheel 150. A compression coil spring 158 is fitted loosely around each projecting part 155 and is thus interposed in compressed state between a surface of the clutch case 149 and a surface of a retaining plate 157 fixed to the outer extremities of the projecting parts 155. These springs 158 act in concert to urge the clutch case 149 to move in the arrow direction A.

The clutch drum 151 is in the form of a cylinder formed integrally with and projecting from one side face of the second-stage gear 116*b* and has an outer diameter which is substantially equal to the maximum diameter of the clutch case 149.

Between the clutch case 149 and the clutch wheel 150, there is interposed the aforementioned clutch plate mechanism 161, in which annular clutch friction plates 159*a* through 159*e* and annular clutch plates 160*a* through 160*e* are alternately and coaxially disposed. The clutch friction plates 159*a* through 159*e* are made of a paper-base material, for example, and respectively have outwardly projecting lugs 162*a* through 162*e* formed at spaced intervals around their outer peripheries. These projecting lugs 162*a* through 162*e* are adapted to engage slidably within corresponding slots 163 formed as shown fragmentarily in FIG. 10 in the clutch drum 151 in directions parallel to the axial direction of the clutch drum. By the construction, the clutch friction plates 159*a* through 159*e* are prevented from rotating relative to the clutch drum 151 but, at the same time, are respectively free to slide independently in the axial direction. Consequently, the clutch drum 151 and the clutch friction plates 159*a* through 159*a* rotate unitarily.

The annular clutch plates 160*a* through 160*e* are made of steel, for example, and respectively have inwardly projecting lugs 164*a* through 164*e* formed at spaced intervals around their inner circular edges.

Figure 11:
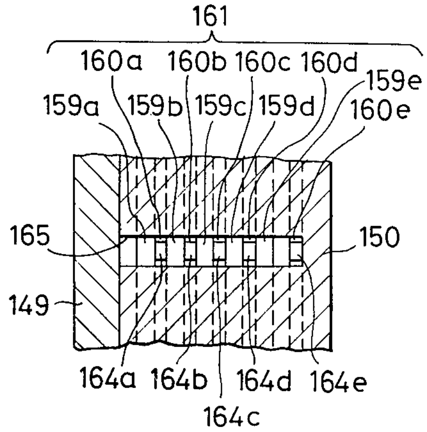
FIG. 11 is a plan view taken along the line XI — XI in FIG. 9 as viewed in the arrow direction.

These projecting lugs 164*a* through 164*e* are adapted to engage slidably within corresponding slots 165 formed in a cylindrical part of the clutch wheel 150 in directions parallel to the axial direction thereof as shown fragmentarily in FIG. 11. By this construction, the clutch plates 160*a* through 160*e* are prevented from rotating relative to the clutch wheel 150 but, at the same time, are respectively free to slide independently in the axial direction. Consequently, the clutch wheel 150 and the clutch plates 160*a* through 160*e* rotate unitarily.

Figure 12:
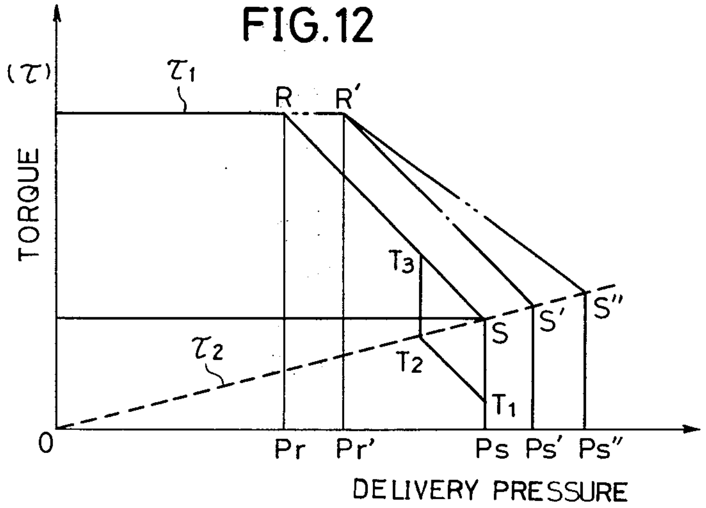
FIG. 12 is a graph indicating the operation of a clutch mechanism.

Next, in order to facilitate an understanding of the operation of the pump device of the above described construction according to the invention, the operation will be described by using FIG. 12. In FIG. 12, the horizontal axis (abscissa) P represents the delivery pressure of the pump 114, while the vertical axis (ordinate) $\tau$ represents rotational torque. Furthermore, the full line indicates the torque $\tau$ 1 transmitted from the motor 110 by way of the clutch mechanism 148 to the clutch wheel 150, while the broken line indicates the torque $\tau$ 2 required for driving the pump 114.

At the time of starting of the operation, the clutch case 149 of the clutch mechanism 148 is at the limiting position of sliding movement in the arrow direction A due to the force of the springs 158, and the clutch wheel 150 is in a state wherein it can transmit the rotation of the clutch drum 151 by way of the clutch plate mechanism 161.

More specifically, since the clutch case 149 is in a state wherein it has been caused by the force of the springs 158 to slide to the maximum limit of its movement in the arrow direction A, the clutch friction plates 159*a* through 159*e* and the clutch plates 160*a* through 160*e* are in mutually pressed state and are thereby in frictional engagement. At the same time, the clutch friction plate 159*a* is pressed against and frictionally engaged with the inner face of the clutch case 149, while the clutch plate 160*e* is pressed against and frictionally engaged with the inner face of the slot 165 of the clutch wheel 150, whereby all frictional engagement forces are at their maximum values. Accordingly, the rotation of the second-stage gear 116*b* is transmitted successively by way of the clutch drum 151, the clutch case 149, the clutch friction plates 159*a* through 159*e*, the clutch plates 160*a* through 160*e*, and the clutch wheel 150 to the third-stage gear 116*c*, whereby this third-stage gear 116*c* and the second-stage gear 116*b* can rotate in a mutually unitary manner.

Then, when the motor 110 is operated, the rotation (power) of its rotor shaft 118 is transmitted by way of the gears 116*a* and 116*b*, the clutch drum 151, the clutch plate mechanism 161, the clutch wheel 150, the rotating shaft 119, the gears 116*c* and 116*d*, and the rotating shaft 120 to the crank 121. The resulting rotation of the crank 121 causes the piston rod 124 to reciprocate in the arrow directions E, F as the cylinder 125 oscillates in the arrow directions C, D. With the reciprocation of the piston rod 124, the pump 114 carries out pumping operation. As a consequence, the liquid from the paint liquid source is pumped through the pipe line 128, the pump 114, the pipe line 131, the liquid pressure detecting device 132, and the pipe line 137 to the spraying device 138. Accordingly, when the trigger or operating lever 138*a* of the spraying device 138 is pulled, the paint liquid is ejected and sprayed against a surface (not shown) to be coated.

During this operation, the liquid delivered under pressure from the pump 114 passes through the liquid pressure detecting device 132, and the end part 141*a* of the plunger 141 is subjected to the liquid pressure within the liquid pressure detecting chamber 135, whereby a force in the arrow direction B is imparted to the plunger 141. Since the liquid pressure is lower than a specific value at the time of starting of operation of the pump 114, the adjusting member 143 provided at the other end of the plunger 141 does not yet abut against the contacted member 144. Consequently, although the delivery pressure P of the pump 114 increases with the starting of the motor 110, the clutch drum 151 rotates unitarily with the clutch wheel 150 without slipping therebetween until the value of the delivery pressure P reaches the value Pr in FIG. 12, and, for this reason, the rotational power of the motor 110 is fully transmitted as it is via the clutch mechanism 148 to the pump 114.

As the pump delivery pressure increases, the plunger 141 is subjected to the increasing liquid pressure within the liquid pressure detecting chamber 135 and is caused by this pressure to slide in the arrow direction B as indicated in FIG. 7 against the force of the springs 142. When the pump delivery pressure P becomes equal to the pressure Pr, the adjusting member 143 abuts against the contacted member 144 fixed to the end of the push rod 146. Consequently, when the pump delivery pressure P becomes higher than the pressure Pr, the clutch case 149 is caused by the plunger 141 under increased pressure to undergo a small sliding displacement in the arrow direction B counter to the force of the springs 158. As a result, the frictional engagement force between the clutch friction plates 159*a* through 159*e* and the clutch plates 160*a* through 160*e* decreases, whereby the clutch mechanism 148 assumes a "half-clutch" state, or partially slipping state, and the clutch case 149 rotates as it slips relative to the clutch wheel 150. For this reason, the rotational torque $\tau$ 1 transmitted to the clutch drum 151 decreases as indicated by the straight line between the points R and S in FIG. 12.

Together with the increase in the pump delivery pressure P, the torque $\tau$ 1 transmitted by way of the clutch mechanism 148 to the clutch drum 151 decreases until it coincides with the torque $\tau$ 2 required for driving the pump 114 (as indicated by point S in FIG. 12), whereupon the pump delivery pressure P coincides and balances with a preset pressure P*s* which has been previously set.

Then, as a consequence of a long period of operation of the spraying device 138 with the pump 114 kept operating as it is, or as a consequence of great throttling or constriction of the nozzle orifice of the spraying device 138, the ejection flow rate, i.e., the ejection quantity per unit time, of the nozzle may become less than the delivery outlet flow rate, i.e., the delivery quantity per unit time, from the pump 114. Then, for this reason, the pressure of the liquid discharged from the delivery outlet 130 of the pump 114 may rise and exceed the above mentioned preset pressure P*s*. In such a case, the plunger 141 is forced by the resulting liquid pressure to slide further from the above described state in the arrow direction B.

As a consequence, the frictional engagement force between the clutch friction plates 159*a* through 159*e* and the clutch plates 160*a* through 160*e*, between the clutch friction plage 159*a* and the surface of the clutch case 149, and between the clutch plate 160*e* and the inner face of the slot 165 of the clutch wheel 150 is further weakened, whereby the rotational speed of the clutch wheel 150 and the torque $\tau$ 1 transmitted thereto decrease. As a result, the liquid delivery flow rate of the pump 114 decreases, and the pressure applied to the spraying device 138 (that is, the value resulting from the multiplication of the above mentioned liquid delivery quantity by the throttling resistance value of the spraying device 138) also decreases. Consequently, the pump delivery pressure automatically returns to its preset value P*s* and is thus maintained constant. Thus, the power transmission factor or rate of the clutch mechanism 148 is controlled in an infinitely-variable, or non-stepwise, manner between the state wherein the clutch drum 151 and the clutch wheel 150 are in rotating in full synchronism (1:1 rotation) and the state wherein they are fully disengaged.

Furthermore, in the case where the liquid pressure P downstream from the delivery outlet 130 of the pump 114 is reduced to a value below the preset value P*s* as a consequence of a sudden opening of the nozzle orifice of the spraying device 138, the plunger 141 is caused by the force of the springs 142 to undergo sliding displacement in the arrow direction A. In accordance with this displacement, the clutch case 149 is also displaced slidingly in the arrow direction A by the force of the springs 158. Consequently, the clutch friction plates 159*a* through 159*e* and the clutch plates 160*a* through 160*e* are pressed together, and the frictional engagement force therebeteeen increases. At the same time, the pressing forces respectively between the clutch friction plate 159*a* and the face of the clutch case 149 and between the clutch plate 160*e* and the inner face of the slot 165 of the clutch wheel 150 increase, whereby the frictional engagement forces between these parts also increase.

As a result, the torque $\tau$ 1 transmitted from the rotor shaft 118 by way of the clutch mechanism 148 to the clutch wheel 150 increases, and, since the crank 121 also rotates accordingly at an increased speed, the liquid delivery flow rate from the pump 114 increases. Consequently, the pressure applied to the spraying device 138 (that is, the value resulting from the multiplication of the above mentioned liquid delivery quantity by the throttling resistance value of the spraying device 138) also increases, and the delivery pressure P automatically returns to its preset value P*s* and is thus maintained constant.

In the case where the degree of opening of the nozzle orifice of the spraying device 138 is adjusted in conformance with conditions such as the shape and dimensions of the object being sprayed as described above, the delivery pressure P of the pump 114 fluctuates temporarily, but the clutch mechanism 148 is capable of automatically adjusting the power transmitted from the motor 110 to the pump 114 thereby to maintain the pump delivery pressure P constant at the preset value P*s*.

Figure 13:
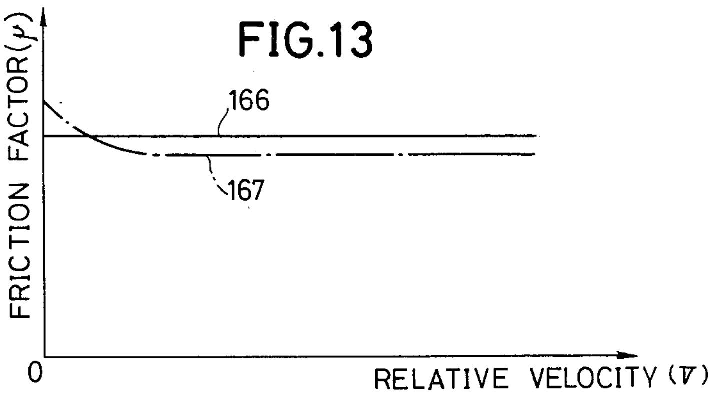
FIG. 13 is a graph indicating static and dynamic friction characteristics of friction plates.

The static and dynamic friction characteristics of the clutch friction plates 159*a* through 159*e* are graphically indicated in FIG. 13. In this graph, the horizontal axis (absicca) V represents relative velocity, while the vertical axis (ordinate) $\mu$ represents friction factor. In the above described embodiment of the invention, a material such as a paper base material, for example, whose values of the static friction factor and of the dynamic friction factor are equal, and, moreover, whose dynamic friction factor is constant irrespective of the value of the relative velocity V, as indicated by full line 166 in FIG. 13, is used for the clutch friction plates 159*a* through 159*e* of the clutch mechanism 148. For this reason, the variation of the torque $\tau$ 1 transmitted from the motor shaft 118 by way of the clutch mechanism 148 to the clutch wheel 150 is smooth, and the delivery pressure P is continually maintained constant at the present pressure P*s*. Thus, a stable control of the pump delivery pressure is achieved.

In contrast, in a clutch mechanism known heretofore wherein a material such as moulded cork, a semimetallic material, or the like is used for the clutch friction plates 159*a* through 159*e*, the values of the static friction and dynamic friction factors differ, and, moreover, the dynamic friction factor also varies with the value of the relative velocity V as indicated by the single-dot chain line 167 in FIG. 13. For this reason, a limit cycle joining points S-T1-T2-T3 in FIG. 12 is produced, whereby the pump delivery pressure fluctuates. In accordance with the present invention, however, this fluctuation is prevented.

The control procedure for adjusting the preset value P*s* of the delivery pressure P of the pump 114 will now be described. First, in the case where the preset pressure P*s* is to be elevated, the adjusting member 143 is rotated in one direction, i.e., the screwing-in direction, to move it in the arrow direction A and thereby to set the spacing distance L between the adjusting member 143 and the contacted member 144 at a larger value. Conversely, for lowering the set pressure value P*s*, the adjusting member 143 is rotated in the opposite (unscrewing) direction to move in the arrow direction B and thereby to set the spacing distance L at a smaller value. For example, in the case where the spacing distance L is increased, the point at which the adjusting member 143 abuts against the contacted member 144 of the push rod 146 moves toward the right in FIG. 12 as from point R to point R′ therein. Therefore, the resulting preset pressure P*s*′ is higher than the pressure P*s*.

Furthermore, the slope of the straight line $\overline{RS}$ in FIG. 12 can be selected as desired by appropriately adjusting the spring constants of the springs 142 and 158. For example, in the case where both group of springs 142 and 158 are respectively interchanged by springs of greater spring constants, the increment $\Delta\tau$ of the transmitted torque $\tau$ with respect to the unit pressure increment $\Delta$P as indicated by the straight line between points R′S″ in FIG. 12 becomes smaller than that of the straight line between the points R′S′. For this reason, the set pressure can also be varied from P*s*′ to P*s*″, and, at the same time, the feedback gain of the liquid pressure detecting device 132 with respect to the clutch mechanism 148 can be reduced.

Further, this invention is not limited to these embodiments but various variations and modifications may be made without departing from the scope and spirit of the invention.

What is claimed is:

1. In a pump device having liquid pressure detecting means, a pump for pumping a liquid from a liquid supply source through a liquid transfer path;

a power source for operating continuously;

power transmission means for transmitting driving power through a power transmission path to said pump for driving the pump;

cluch means in said power transmission path for coaction with said liquid pressure detecting means; said device comprising, in combination, means for detecting the pressure of the liquid delivered by the pump, said means being defined by a liquid pressure detecting chamber provided in and constituting a part of said liquid transfer path, the liquid being transferred through said liquid transfer path thereby being introduced into and through said chamber, a displacement member subject to the pressure of the liquid within said liquid pressure, means for urging said displacement member in a direction opposite to that in which said member moves when subjected to said liquid pressure, and means for adjusting the distance between said displacement member and said control means for adjusting the setting of said predetermined displacement value; said clutch means being a first rotating structure responsive to rotational power transmitted thereto from said power source, a second rotating structure responsive to rotational power transmitted thereto from said first rotating structure and transmitting said rotation to said pump, clutch means interposed between said first and second rotating structures being operational upon being pressed therebetween with a clamping force to transmit rotational power in conformance with said clamping force, and control means spaced apart from said displacement member operable in response to displacement by said displacement member of a magnitude greater than a predetermined displacement value for controlling said clamping force of said first and second rotating structures as applied against said clutch structures.

* * * * *